Jan. 31, 1950        A. C. RIPKE        2,495,824
TRANSMISSION
Filed Nov. 26, 1945
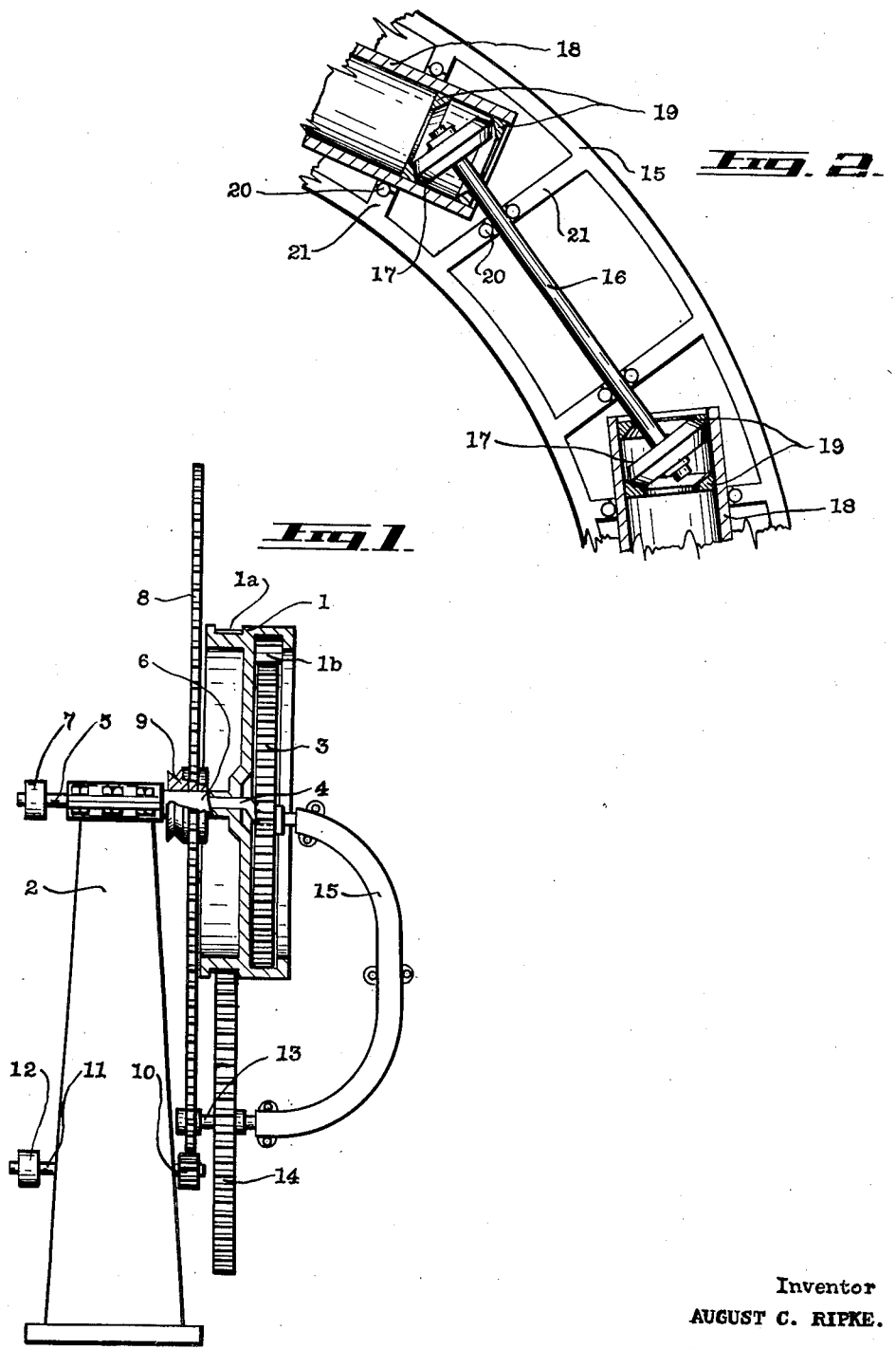
Inventor
AUGUST C. RIPKE.
By W. Irwin Haskett.
Attorney.

Patented Jan. 31, 1950

2,495,824

UNITED STATES PATENT OFFICE 2,495,824

TRANSMISSION

August C. Ripke, Austin, Minn.

Application November 26, 1945, Serial No. 630,800
In Canada September 23, 1942

3 Claims. (Cl. 74—380)

My present invention relates to improvements in a transmission and appertains particularly to a novel direction-changing shaft coupling.

An object of the invention is to provide a mechanism for varying the direction of a revolving shaft.

An object is to provide a shaft coupling consisting of engaging gear shafts and sleeves revolvably enclosed in a suitable housing.

The device includes in combination with a pair of non-aligned spaced revolving shafts, either of which may be driven from a suitable source, a direction-changing means consisting of gears and shaft coupling.

To the accomplishment of the above and related objects, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

In the drawings:

Figure 1 is an elevation of a mechanical structure employing my transmission mechanism, parts thereof being broken away;

Figure 2 is an enlarged detail of a portion of the instant type of novel shaft coupling employed.

This transmission is shown applied to a mechanical structure comprising a fixed compound annular gear or gear ring 1 mounted on a standard 2 from which it is laterally offset. The gear 1 has an exterior gear trough 1a and an interior gear trough 1b of the same radius. An hypocyclical gear pinion 3 runs in the interior trough 1b and is mounted for rotation on the cranked end 4 of a shaft 5 that extends axially through the compound gear ring 1 whose hub 6 is offset to the supporting standard 2. The far end of the shaft 5, beyond the standard, has a pulley 7 adapted to be driven by any suitable means.

Mounted to rotate on the gear ring's offset hub 6 is a large disk or gear 8 and a pulley 9 applied laterally thereto. The former with a pinion 10 on a shaft 11 passing through the standard 2 near the bottom thereof and carries a pulley 12 on its other end off which power may be taken. Near its circumference this large disk or gear 8 carries a stub shaft 13 that serves as an axle spindle for rotatably supporting an epicyclical gear 14 that runs in the exterior trough 1a.

The specific shaft coupling which is the subject of this application and connects the hubs of the two gears 3 and 14 comprises a substantially semicircular section of tubular housing 15 whose opposite open ends are suitably journalled on or connected with the hubs of the gears 3 and 14 respectively, which due to the particular structure shown retain a constant spacing. Between these gear pinions, and supported within the housing 15 are a series of shafts 16 with gears 17 on each end and connecting sleeves 18 interiorly geared at both ends to engage with said pinions 17, as may be seen in detail in Figure 2.

The gears 17 are here shown as double bevels and are engaged between a pair of confronting bevel gear rings 19 interiorly mounted near the respective ends of the sleeves 18. Either by longitudinal adjustment of the gear rings 19 in the sleeve 18 and/or the longitudinal adjustment of the double bevel pinion 17 on the shaft 16 all slack, in this type of shaft coupling can be taken up.

Both the shafts 16 and the sleeves 18 are revolvably supported in roller bearing sets 20 mounted in spiders 21 on the inside of the tube 15 which latter is preferably formed of laterally separable halves as clearly shown in the principal view; the end sleeves 18 being connected respectively with the gears 3 and 14.

In operation, when power is applied to the pulley 7, it drives the gear pinion 3 on the shaft 5 around its interior trough 1b causing the pinion to rotate and this movement is communicated by means of the direction-changing, rigidly housed shaft coupling to the second gear pinion 14.

From the foregoing description taken in connection with the accompanying drawings, it will be manifest that a transmission is provided that will fulfill all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

Having thus described my invention, what I claim as new and desire to secure by Letters Patent is:

1. A transmission mechanism having means for changing direction, consisting of a train of rotating parts and comprising angularly disposed, longitudinally spaced shafts with friction gears on each end, sleeves between said shafts, and being disposed at an angle thereto, and being interiorly geared at both ends to engage said shaft gears, and means for rotatably supporting both said shafts and said sleeves.

2. A transmission mechanism having means for changing direction, consisting of a train of rotating parts and comprising angularly disposed, longitudinally spaced shafts, friction gears on the ends thereof, sleeves between said shafts, and at an angle thereto, confronting spaced friction gear rings interiorly mounted in the ends of said sleeves to engage with said first mentioned friction gears, and means for rotatably supporting both said shafts and said sleeves following the contour of the change of direction of the train of rotating parts.

3. A transmission mechanism having means for changing direction, consisting of a train of rotating parts and comprising angularly disposed, longitudinally spaced shafts, friction gears longitudinally adjustable on the ends thereof, sleeves between said shafts, and at an angle thereto confronting adjustably spaced friction gear rings interiorly mounted in the ends of said sleeves to mesh with said first mentioned friction gears, and a housing formed of laterally separable half shells, for rotatably supporting both said shafts and said sleeves, following the contour of the change of direction of the train of rotating parts.

AUGUST C. RIPKE.

REFERENCES CITED

The following references are of record in the file of this patent:

UNITED STATES PATENTS

| Number | Name | Date |
| --- | --- | --- |
| 1,881,931 | Powell | Oct. 11, 1932 |
| 2,090,810 | Russell | Aug. 24, 1937 |
| 2,147,832 | Drexler | Feb. 21, 1939 |

FOREIGN PATENTS

| Number | Country | Date |
| --- | --- | --- |
| 116,240 | Austria | Feb. 10, 1930 |
| 389,088 | France | Aug. 24, 1908 |
| 629,719 | Germany | Apr. 23, 1936 |